United States Patent [19]

Harwood

[11] 4,038,681
[45] July 26, 1977

[54] CHROMA-BURST SEPARATOR AND AMPLIFIER

[75] Inventor: Leopold Albert Harwood, Somerville, N.J.

[73] Assignee: RCA Corporation, New York, N.Y.

[21] Appl. No.: 653,289

[22] Filed: Jan. 29, 1976

[51] Int. Cl.$^2$ .............................................. H04N 9/46
[52] U.S. Cl. ........................................................ 358/20
[58] Field of Search ................................... 358/20, 40

[56] References Cited

U.S. PATENT DOCUMENTS 3,789,141  1/1974  Ayaki et al. ................. 358/20 X

FOREIGN PATENT DOCUMENTS 2,208,791  10/1972  Germany ............................. 358/20
1,172,486  12/1969  United Kingdom .................. 358/20

Primary Examiner—Robert L. Richardson
Attorney, Agent, or Firm—Eugene M. Whitacre; Ronald H. Kurdyla

[57] ABSTRACT

A chroma-burst separator and amplifier suitable for use in the chrominance channel of a color television receiver includes a differential amplifier for supplying antiphase composite chrominance signals including burst and chroma signal components to first and second gating circuits, respectively. The first and second gating circuits conduct in complementary fashion in response to keying pulses coincident with the burst and chroma signal intervals for providing separated antiphase burst and antiphase chroma output signals each with differential direct potentials which remain substantially constant and equal throughout the chroma and burst intervals.

11 Claims, 1 Drawing Figure

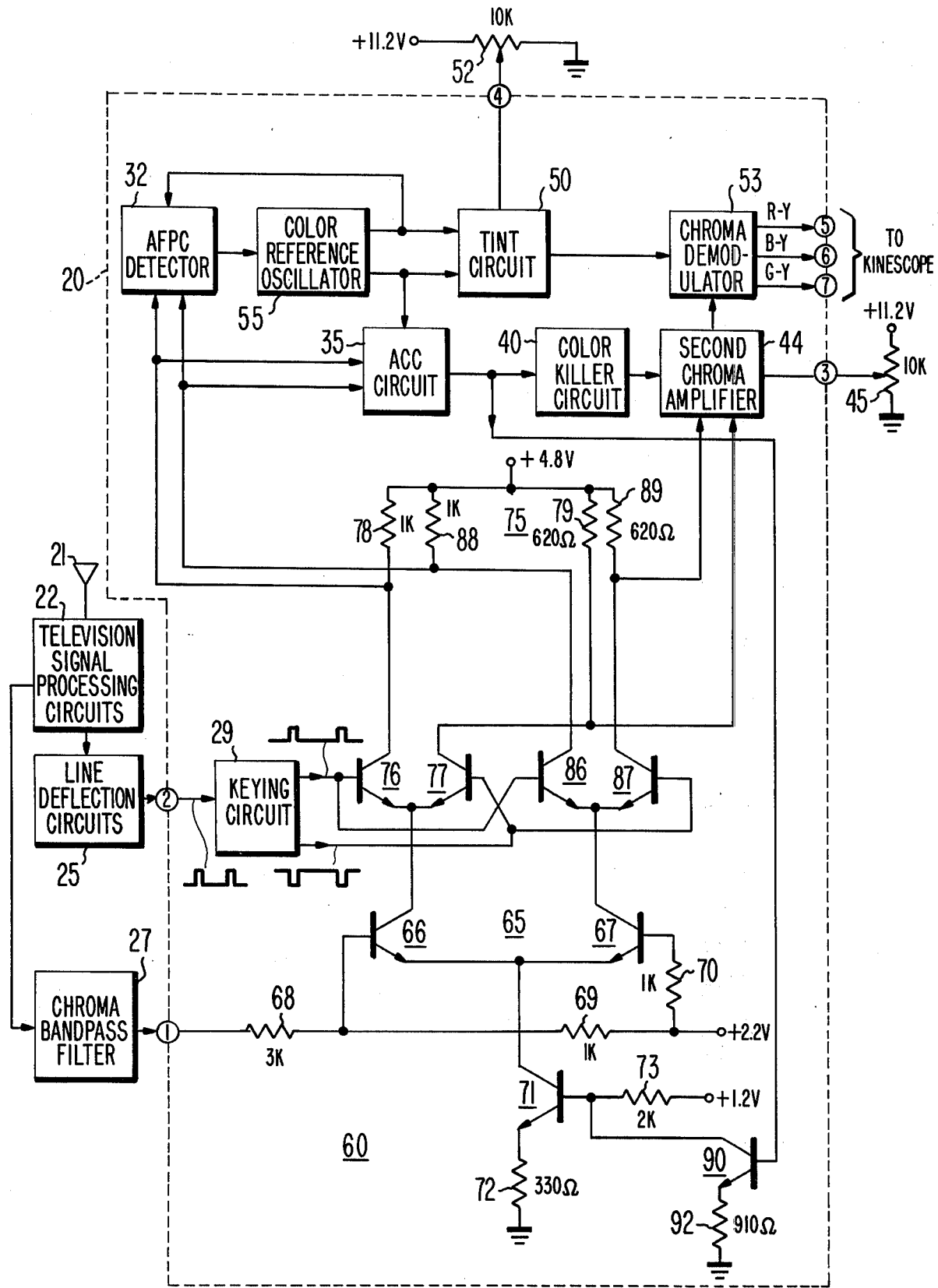

CHROMA-BURST SEPARATOR AND AMPLIFIER

This invention relates to color television signal processing circuits such as may be employed in a chrominance channel of a receiver for amplifying and separating a color reference burst component and a chrominance (chroma) information cmponent of a transmitted television signal. More specifically, the invention relates to circuits particularly adapted for integrated circuit techniques.

In a color television receiver, it is customary to separate burst and chrominance signals from the remainder of the television signal and also to separate the time-sequential burst and chrominance signals from each other.

In order to avoid undesirable effects in succeeding circuits which utilize the chroma and burst components, the chroma-burst separator should minimize switching signal transients or spurious signal disturbances which tend to degrade the burst and chroma output signals. Also, in the case of direct coupled circuits, the differential DC components at the burst and chroma outputs of the separator should be maintained substantially constant throughout the burst and chroma intervals so that the operating points of succeeding direct coupled utilization circuits are not undesirably affected. It is also desirable to avoid the use of tuned elements in the chroma-burst separator.

Numerous arrangements are known which combine the chroma-burst separating and amplifying functions in a single stage. Some examples are found in U.S. Pat. No. 3,711,634; No. 3,789,141; No. 3,626,089 and the TBA 560C integrated circuit manufactured by Philips Gloeilampenfabrieken of Eindhoven, Netherlands. These and other known arrangements either exhibit disadvantages related to the factors mentioned previously or are unduly complicated.

Apparatus in accordance with the present invention comprises a differential amplifier responsive to composite chrominance signals for producing amplified antiphase signals at first and second output terminals. First and second gating circuits are coupled to the respective output terminals, each gating circuit comprising first and second current conducting devices having gating input, signal input, and output terminals. The signal input terminals of the devices of the first and second gating circuits are coupled, respectively, in common to the first and second outputs of the differential amplifier. Means are also included for providing recurring, periodic gating signals having a burst interval and a chroma signal interval. The gating signals are coupled to the gating inputs of the first and second gating circuits for rendering the first current conducting devices of each of the gating means conductive and the second devices non-conductive during the burst interval to produce anti-phase separated burst components at the output terminals of the first devices. The gating signals further render the first and second devices of each gating means respectively non-conductive and conductive during the chroma interval to produce antiphase separated chroma components at the output terminals of the second devices.

Referring to the drawing, color television signals received by an antenna 21 are processed by circuits 22 to provide horizontal (line) synchronizing pulses which are coupled to line deflection circuits 25. Detected video signals also are coupled from the output of processing circuits 22 to a chroma bandpass filter 27 arranged to select color-representative signals including a suppressed subcarrier chrominance signal component and a color burst component. The color burst information is transmitted during the relatively short color synchronizing portion of each horizontal line scanning interval following an image-representative portion thereof.

The time-sequential burst and chrominance signal components are coupled from filter 27 to an input terminal 1 of an integrated chrominance signal processing circuit 20. Keying signals from the line deflection apparatus 25 are coupled to a keying circuit 29 via an input terminal 2.

Integrated circuit 20 also comprises a gain controlled, gated amplifier 60 constructed according to the invention. Gated amplifier 60 serves to amplify and separate the chroma and burst components and comprises a differential amplifier portion 65 and a gating stage 75.

Amplifier portion 65 comprises similar transistors 66 and 67, the former being supplied with composite chrominance signals at a base electrode via terminal 1 and a resistor 68. Transistors 66 and 67 are supplied with operating current from a controlled current source transistor 71. Bias current is supplied to transistor 71 from a bias potential source (+1.2 volts) via a resistor 73. Transistors 66 and 67 are symmetrically biased by a biasing network comprising equal value bias resistors 69 and 70 and a second bias potential source (+2.2 volts). Conduction of transistor 71 is controlled by a variable gain automatic chroma control (ACC) amplifier comprising a transistor 90 and an emitter resistor 92.

Gating stage 75 comprises first and second pairs of similar gating transistors 76, 77 and 86, 87. Emitter input electrodes of transistors 76 and 77 are connected in common to a collector output electrode of transistor 66, while emitter input electrodes of transistors 86 and 87 are connected in common to a collector output electrode of transistor 67. Antiphase (i.e., push-pull) output signals from transistors 76, 86 and 77, 87 are respectively developed across output load resistors 78, 88 and 79, 89. In the illustrated arrangement, resistors 78 and 88 are equal, and resistors 79 and 89 are equal. Output signals appearing across resistors 78 and 88 are direct coupled to first and second inputs of an automatic frequency and phase control (AFPC) detector 32 and to first and second inputs of an ACC circuit 35. Output signals appearing across resistors 79 and 89 are direct coupled to first and second inputs of a second chroma amplifier 44. In this example, antiphase periodic gating signals are coupled from first and second outputs of keying circuit 29 to interconnected base electrodes of transistor pairs 76, 86 and 77, 87 for controlling the relative conduction of transistors 76, 86 and 77, 87 in complementary fashion.

The burst and chroma signal components of the periodic composite chrominance signal occur during predetermined intervals of the period of the composite chrominance signal, which period corresponds to a line scanning operating cycle (e.g., about 63 microseconds). The burst signal interval occurs near the end of each such cycle following the image-representative chroma signal interval. The relatively narrow periodic gating pulses supplied by keying circuit 29 recur at the line scanning rate (approximately 15,734 Hz under U.S. standards) and have a duration of about five microseconds coincident with the burst signal interval. The remaining portion of the period of the gating signals includes the chroma signal interval.

In the quiescent condition of amplifier 60, the current supplied by transistor 71 divides substantially equally between similarly biased amplifier transistors 66 and 67. It is noted that transistors 66 and 67 receive balanced base current bias as a function of the ratio of bias resistors 69 and 70. This is significant for integrated circuit applications, since the ratio of resistance values of integrated resistors can be accurately established although the absolute resistance values may vary thirty percent or more. The differential quiescent voltage appearing between the collector outputs of transistors 66 and 67 is balanced and remains substantially constant as established by resistors 69 and 70. The quiescent collector currents of transistors 66 and 67 similarly divide substantially equally in the succeeding upper pairs of gating transistors 76, 77 and 86, 87.

In operation, the composite chrominance signals applied to the base of transistor 66 are reproduced in amplified antiphase form at the collectors of transistors 66 and 67. Gating signals of the illustrated polarity are supplied from keying circuit 29 to render each of transistor pairs 76, 86 and 77, 87 conductive and non-conductive, in complementary fashion. That is, transistors 76 and 86 will be rendered conductive and transistors 77 and 87 will be rendered non-conductive or cut-off in response to the relatively narrow portion of the gating pulses which coincides with the burst interval of each operating cycle. Transistors 76 and 86 therefore respectively conduct the antiphase burst signal components which appear at the collectors of transistors 66 and 67 to produce burst outputs in antiphase relation across associated output load resistors 78 and 88. During the burst interval, the direct voltage appearing at each of the collectors of transistors 78 and 86 is equal to the direct supply voltage (4.8 volts) reduced by equal direct voltage drops across resistors 78 and 88. The collector outputs of transistors 77 and 87 will be substantially equal to each other and equal to the direct supply voltage at this time.

During the remaining, relatively longer interval of each operating cycle, transistors 76 and 86 are rendered non-conductive and transistors 77 and 87 are each gated "on" to respectively conduct the chroma signal component which appears in antiphase relation at the collectors of transistors 66 and 67. The chroma signal components appear in antiphase relation across associated output load resistors 79 and 89. During the chroma interval, the direct voltage appearing at each of the collectors of transistors 77 and 87 is equal to the direct supply voltage reduced by equal direct voltage drops across resistors 79 and 89. The collector outputs of transistors 76 and 86 will be substantially equal to each other and equal to the direct supply voltage at this time.

The values of output resistors 78, 88 and 79, 89 are related to the gain of amplifier 60, and are chosen to establish a predetermined relationship between the magnitude of the burst and chroma output signals.

ACC circuit 35 provides an output control voltage representative of the deviation of the magnitude of the burst component from a reference value. The ACC voltage is applied to the base of ACC amplifier transistor 90 for controlling the current conduction thereof. Transistor 90 in turn controls the current conduction or gain of amplifier 60 by controlling the base drive of current source transistor 71 to maintain a desired magnitude for the burst and chroma output signals from amplifier 60.

For example, when the magnitude of the burst component increases, the ACC control voltage correspondingly increases to cause increased conduction of transistor 90, which produces a compensating decrease in the conduction or gain of transistor 71 and therefore of amplifier 60. When the magnitude of the burst component decreases, the ACC control voltage correspondingly decreases, causing decreased conduction of transistor 90, which in turn produces a compensating increase in the conduction of transistor 71 and therefore of amplifier 60. Although the DC voltages respectively appearing at the collector electrodes of transistors 66 and 67 vary in response to the ACC control voltage, the differential DC voltage appearing between the collectors of transistors 66 and 67 remains substantially constant with changes in the ACC control voltage.

It is noted that the absolute magnitude of the direct voltage appearing at each of the collectors of transistors 76 and 86 varies due to gating transistors 76 and 86 into and out of conduction during each operating cycle. However, the magnitude of the differential output direct voltage level appearing between the collectors of transistors 76 and 86 remains substantially unchanged for each operating cycle. The magnitude of the differential output direct voltage is a function of the voltage offsets produced by transistors 66, 67 and of the mismatch, if any, between resistors 78 and 88. With proper design (e.g., moderate gain and matching of output resistors 78 and 88), the differential output direct voltage is maintained within a tolerance of about ±20 mv. Burst gating transistors 76 and 86 do not contribute to producing an imbalance of the differential output direct voltage.

Observations analogous to the above apply for chroma gating transistors 77, 87 and associated output resistors 79, 89 of the chroma output of amplifier 60. That is, while the absolute magnitude of the direct voltage appearing at each of the collectors of transistors 77 and 87 varies due to gating transistors 77 and 87 into and out of conduction, the magnitude of the differential output direct voltage appearing between the collectors of transistors 77 and 87 remains substantially unchanged for each operating cycle.

The magnitude of the differential output direct voltage appearing between the collectors of transistors 77 and 87 is substantially constant and equal to that appearing between the collectors of transistors 76 and 86 for each operating cycle. However, it will be appreciated that the magnitude of the direct voltage appearing at each of the collectors of transistors 77 and 87 during the chroma interval is related to the value of resistors 79 and 89, respectively. Similarly, the magnitude of the direct voltage appearing at each of the collectors of transistors 76 and 86 during the burst interval is related to the values of resistors 78 and 88, respectively.

The (antiphase) burst and chroma signal outputs of amplifier 60 therefore may be direct coupled to succeeding circuits without the need for additional fixed or adjustable tailoring circuits to compensate for variations of the direct voltage component of the output signals.

It is also noted that signal transients which can be produced by switching transistors 76, 86 and 77, 87 in and out of conduction appear in common-mode relation across the output load resistor pairs associated with the burst and chroma outputs of amplifier 60. Common-mode signal degrading disturbances such as switching transients as well as common-mode DC components appearing at each of the outputs of amplifier 60 are readily cancelled by the input common-mode rejection characteristics of differential amplifiers to which the outputs of amplifier 60 may be coupled.

Transistor pairs 76, 77 and 86, 87 form a cascode signal amplifier with associated transistors 66 and 67. This arrangement provides the desirable effect of low collector-base feedback capacitance and contributes to reduced phase shift of the separated chroma and burst output signals. The cascade arrangement provides excellent response characteristics in the frequency range of the normal color signals (i.e., 2-4 MHz). In addition, output current imbalance errors attributable to gating transistors 76, 77, 86 and 87 are minimized as a consequence of operating the gating transistors between fully conductive and non-conductive states.

A chroma-burst amplifier of the type described represents a relatively simple and convenient means of simultaneously satisfying the burst signal input requirements of AFPC detector 32 and ACC circuit 35, and the gain-controlled chroma signal input requirements of second chroma amplifier 44, without requiring additional signal amplifying and separating circuitry for each of the last-mentioned elements 32, 35 and 44.

Although the invention has been disclosed in terms of a particular circuit embodiment, it should be appreciated that other arrangements may be devised by those skilled in the art without departing from the scope of the invention.

For example, active circuit elements may be used in place of disclosed output resistors 78, 79, 88 and 89. Also, push-pull composite chrominance signals may be respectively applied to the base electrodes of transistors 66 and 67 of amplifier stage 65, and gating signals may be applied to gating stage 75 in single-ended fashion.

Suitable AFPC, oscillator, second chroma amplifier and ACC circuits are described in my U.S. Pat. No. 3,740,456; No. 3,740,461; No. 3,740,462 and U.S. Patent application Ser. No. 633,462. More specifically, illustrated AFPC DETECTOR 32 can comprise an AFPC circuit of the type disclosed in U.S. Pat. No. 3,740,456, and a circuit suitable for use as illustrated ACC CIRCUIT 35 is shown in U.S. Pat. No. 3,740,461. A circuit suitable for use as illustrated SECOND CHROMA AMPLIFIER 44 is shown in U.S. Pat. No. 3,740,462.

What is claimed is:

1. Electronic signal processing apparatus for separating and amplifying burst and chroma signal components of a periodic color television composite chrominance signal including a color reference burst signal component and a chroma information signal component respectively occuring during first and second predetermined intervals of the period of said composite signal, comprising:

differential amplifier means having at least one input terminal and first and second antiphase output terminals, said amplifier means being responsive to composite signals applied to said input terminal for producing amplified antiphase composite signals at said output terminals;

first gating means comprising first and second current conducting devices each having a gating input terminal, a signal input terminal and an output terminal, said signal input terminals being coupled in common to said first output terminal of said amplifier means;

second gating means comprising first and second current conducting devices each having a gating terminal, a signal input terminal and an output terminal, said signal input terminals being coupled in common to said second output terminal of said amplifier means; and means for providing periodic gating signals with a period comprising first and second gating intervals respectively coincident with said first and second predetermined intervals of said composite signal, said gating signal means being coupled to said gating inputs of said first and second gating means for rendering said first and second current conducting devices of each of said gating means respectively conductive and non-conductive during said first gating interval to produce antiphase separated burst components at said output terminals of said first devices and for rendering said first and second current conducting devices respectively non-conductive and conductive during said second gating interval to produce antiphase separated chroma components at said output terminals of said second devices, said output terminals of said first devices and said output terminals of said second devices each having associated therewith a differential direct output voltage which remains substantially constant during said first and second gating intervals.

2. Apparatus according to claim 1, wherein said differential amplifier means comprises:

first and second transistors each having base, emitter, and collector output electrodes and arranged in emitter coupled differential amplifier configuration;

composite chrominance signal supply means coupled to at least one of said base electrodes;

operating current supply means coupled to said emitter electrodes; and bias means coupled to said base electrodes for maintaining substantially equal conduction in said first and second transistors.

3. Apparatus according to claim 2, wherein:

said first and second current conducting devices of said first gating means respectively comprise third and fourth transistors each having emitter input electrodes coupled in common to said collector output of said first transistor, base input electrodes coupled to said gating signal means, and collector output electrodes; and said first and second current conducting devices of said second gating means respectively comprise fifth and sixth transistors each having emitter input electrodes coupled in common to said collector output of said second transistor, base input electrodes coupled to said gating signal means, and collector output electrodes.

4. Apparatus according to claim 3, wherein:

said operating current supply means comprises a seventh transistor having a base electrode coupled to a source of reference bias current and having a main current conduction path coupled between joined emitters of said first and second transistors and an operating potential; and said bias means comprises first and second direct current coupling means respectively coupling said base electrodes of said first and second transistors to a reference potential, said first and second direct coupling means having substantially equal resistance values.

5. Apparatus according to claim 4, wherein:

said gating signal means provides first periodic gating signals comprising said first and second gating intervals coupled to said base input electrodes of said third and fifth transistors, and second periodic gating signals comprising said first and second gating intervals coupled to said base input electrodes of said fourth and sixth transistors, said first and second gating signals being in antiphase relation, whereby said third and fifth transistors and said fourth and sixth transistors are respectively rendered conductive and non-conductive in complementary manner to produce said separated burst components in antiphase relation at said collector output electrodes of said third and fifth transistors during said first gating interval and to produce said separated chroma components in antiphase relation at said collector output electrodes of said fourth and sixth transistors during said second gating interval.

6. Apparatus according to claim 5 and further comprising:

control means coupled to said seventh transistor and responsive to control signals representative of the magnitude of said separated burst components for controlling the conduction of said seventh transistor in accordance with the magnitude of said control signals.

7. Apparatus according to claim 6, wherein said control means comprises:

a gain controlled transistor having a base coupled to said control signals and a collector-emitter path shunting the base-emitter circuit of said seventh transistor.

8. Apparatus according to claim 7 and further comprising:

first, second, third and fourth broad bandwidth output impedance means respectively coupling said collector output electrodes of said third, fourth, fifth and sixth transistors to an operating potential.

9. Apparatus according to claim 8, wherein:

said first and third impedance means exhibit substantially equal resistance values; and said second and fourth impedance means exhibit substantially equal resistance values.

10. Apparatus according to claim 9, wherein:

said impedance means comprise first, second, third and fourth resistors.

11. Apparatus according to claim 10, wherein:

said collector output electrodes of said third and fifth transistors are direct current coupled to respective inputs of means for providing output signals representative of the phase and/or frequency of said burst component, and to respective inputs of means for providing said control signals representative of the magnitude of said burst component; and said collector output electrodes of said fourth and sixth transistors are direct current coupled to respective inputs of means for amplifying said chroma component.

* * * * *